Oct. 5, 1943.  E. R. GASSER  2,331,180
FRICTION CLUTCH
Filed Dec. 15, 1941  3 Sheets-Sheet 1

Inventor
EMIL R. GASSER.

Oct. 5, 1943.  E. R. GASSER  2,331,180
FRICTION CLUTCH
Filed Dec. 15, 1941  3 Sheets-Sheet 2
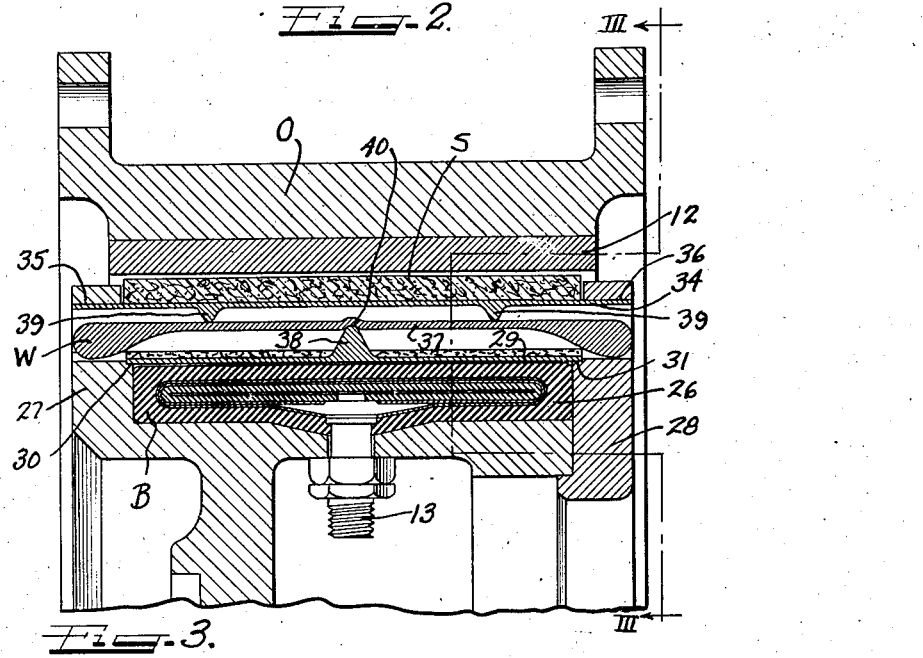
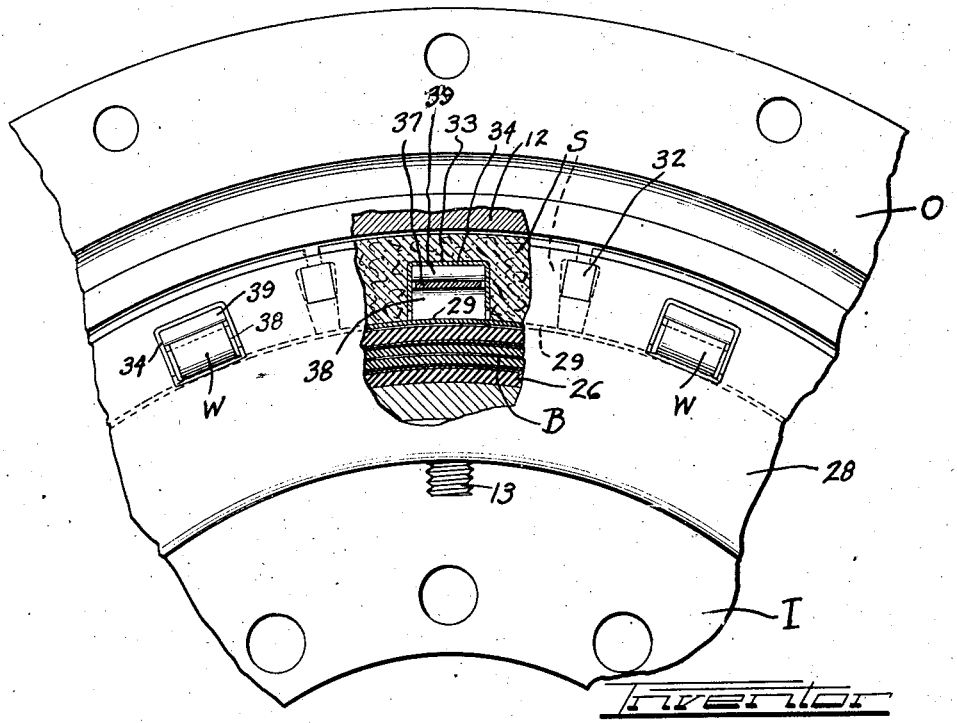
Inventor
EMIL R. GASSER.

Oct. 5, 1943.  E. R. GASSER  2,331,180
FRICTION CLUTCH
Filed Dec. 15, 1941   3 Sheets-Sheet 3
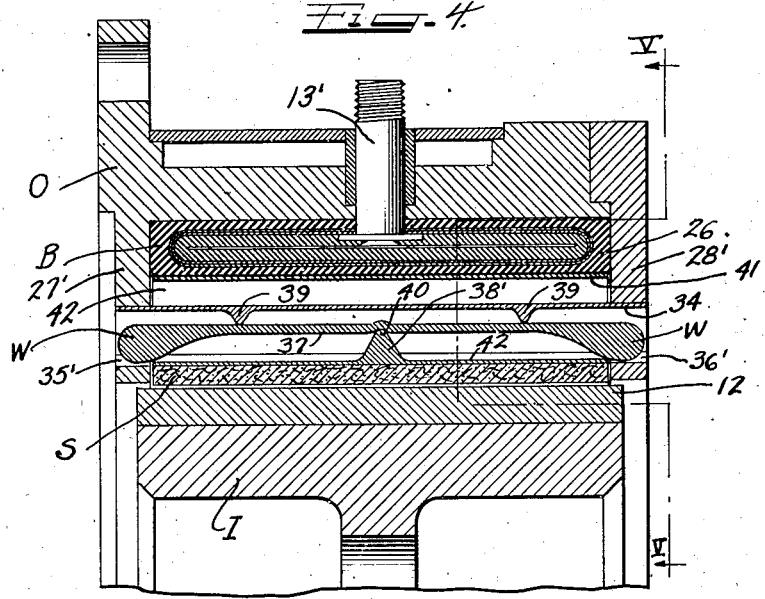
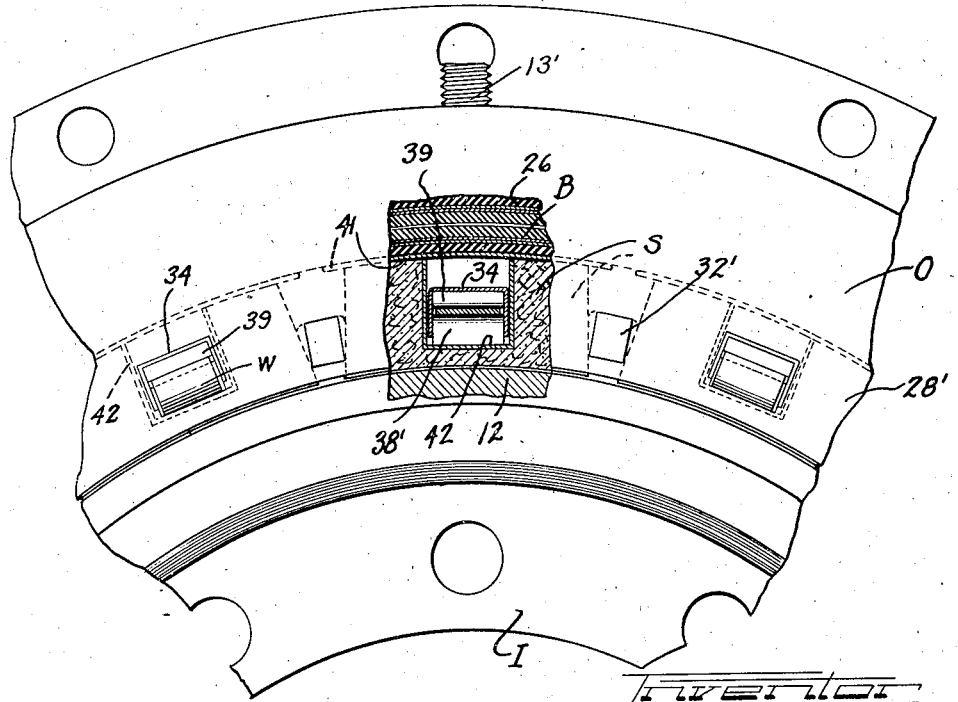
Inventor
EMIL R. GASSER.

Patented Oct. 5, 1943

2,331,180

UNITED STATES PATENT OFFICE 2,331,180

FRICTION CLUTCH

Emil R. Gasser, Buffalo, N. Y., assignor to Farrel-Birmingham Company, Incorporated, Buffalo, N. Y., a corporation of Connecticut Application December 15, 1941, Serial No. 422,961

8 Claims. (Cl. 192—88)

My invention relates to friction clutches, particularly to the expanding and constricting type of airflex clutches in which friction shoes on one of the clutch elements are applied by controllable air pressure to the other clutch element for the desired driving ratio.

In the type of clutch referred to, when no driving connection is desired between the clutch members, the friction shoes on one of the members should be held retracted out of engagement with the other clutch member. In prior structures, ordinary springs have been employed for holding the shoes retracted when the clutch is idle. In the expanding type of clutch, where the friction shoes are mounted on the inner clutch member for outward shift by air pressure against the outer clutch member, the centrifugal force on the shoes will counteract the force of the springs and will bring the shoes into friction engagement with the outer clutch member before air pressure is applied to the shoes, and therefore extremely stiff springs have to be employed to prevent such centrifugal engagement of the shoes. However, with such stiff springs, unduly high air pressure was required for inflation of the rubber tube by means of which the air pressure was applied to the shoes.

An important object of my invention is to provide improved springs for the shoes designed to hold the shoes retracted when the clutch is idle but responsive to centrifugal force to counteract and neutralize the centrifugal action on the shoes tending to throw them into clutching engagement, so that the operation of the clutch may be dependent entirely on the air pressure applied in the tube structure which operates the shoes.

In the constricting type of airflex clutch, where the shoes are mounted on the outer clutch member, the centrifugal force during operation of the clutch tends to throw the shoes outwardly to retract them from the inner clutch member, and another important object of my invention is to provide improved springs for the shoes responsive to centrifugal force to neutralize the centrifugal action against the shoes, so that the application of the shoes for clutch driving will be dependent entirely on the pressure applied to the air tube or bag.

The above referred to and other features of my invention are incorporated in the structure shown on the accompanying drawings, in which drawings:

Figure 2 is an enlarged section of a portion of the clutch shown in Figure 1;

Figure 3 is a side view of a portion of the clutch partially in section on plane III—III of Figure 2;

Figure 4 is a section like Figure 2 but showing my invention applied to the constricting type of clutch; and Figure 5 is a side view partially in section on plane V—V of Figure 4.

Figure 1:
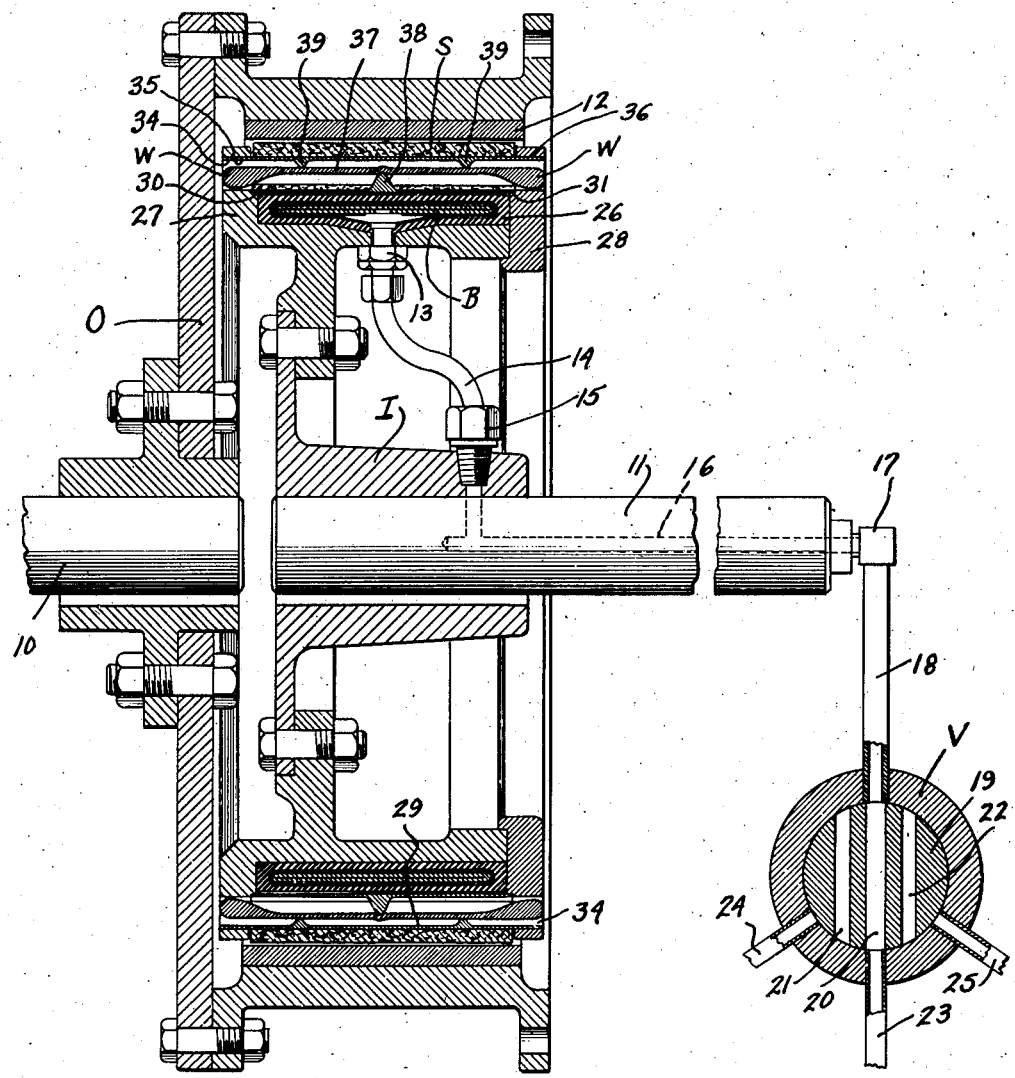
Figure 1 is a diametral cross section of a clutch showing my invention applied thereto.

Referring to Figure 1, the outer clutch member 0 is mounted on the shaft 10, and the inner clutch member I is mounted on the shaft 11. The clutch shown on Figures 1, 2, and 3 is of the expanding type, the friction shoes S and the pneumatic bag or tube B being mounted on the inner clutch member, the outer clutch member supporting the friction ring 12. The bag inlet nipple 13 is connected by a pipe 14 with a plug 15 secured in the hub of the inner clutch member and communicating with the passageway 16 in the shaft 11 which at its outer end connects with a rotary air seal 17 of suitable design which is connected by the pipe 18 with the valve structure V. The valve structure shown comprises a rotary valve plug 19 having ports 20, 21, and 22 therethrough for connection of the pipe 18 with an air pressure inlet pipe 23, or a suction pipe 24, or a vent pipe 25.

In the arrangement of Figures 1 to 3, the bag, when collapsed, is of substantially rectangular cross section with its outer wall or body 26 seated against the cylindrical side of the inner clutch member I and between the flanges or side walls 27 and 28.

The friction shoes or blocks S extend in a circumferential line on the inner clutch member and are provided with base plates 29 vulcanized thereto, the shoes, when retracted, resting at their ends against annular shoulders 30 and 31, the shoes thus extending around and over the recess in which the bag B is mounted so that, upon inflation of the bag, the shoes will be shifted radially outwardly for friction engagement with the friction ring 12 on the outer clutch member 0. For holding the shoes in circumferential alignment and for guiding them in their radial movement guide bars 32 are provided which extend between the flanges or side walls 27 and 28 of the inner clutch member.

Each shoe has a rectangular recess 33 therein above its base plate and extending therethrough from one side to the other, and extending through the recess is a sheet metal beam 34 of inverted U cross section whose ends fit into openings 35 and 36 in the side walls 27 and 28 respectively of the inner clutch member. These beams 34 are held against movement, but their side walls terminate a distance short of the base plates of the shoes, so that the shoe structures may shift radially relative to the beams for frictional engagement with the outer clutch member.

In each U-beam or frame 34 is a spring element 37. As shown, each of the spring elements is a single spring leaf extending longitudinally in the corresponding frame 34, between an inner abutment 38 and outer abutments 39, these abutments providing fulcrum points for the springs. The inner abutment 38 is provided on the base plate 29 of the friction shoe at the middle thereof, while the outer abutments 39 extend from the outer wall of the frame 34 at points equidistant laterally from the abutment 38. The springs at their outer portions back or fulcrum against the outer abutment 39 and at their middle points engage and fulcrum against the abutment 38, the spring being normally tensed to exert pressure radially inwardly against the abutment 38. In the arrangement of Figures 1 to 3, the pressure of the springs against the abutments 38 will tend to hold the shoes S inwardly and seated against the shoulders 30 and 31 to hold the outer faces of the shoes disengaged from the friction ring 12. When the clutch is to operate, the valve V is set for flow of air under pressure into the bag B for inflation thereof and outward radial shift thereby of the shoes against the resistance of the springs 37 and against the friction ring 12 for drive of the outer clutch member O. As the speed of rotation increases, centrifugal force will tend to force the shoes outwardly into increasing frictional engagement with the outer clutch member so that the pressure on the friction surface would become a function of the speed and the applied air pressure. It is, however, desirable that the friction engagement of the clutch should be dependent entirely on the applied air pressure in the pneumatic bag. I therefore provide means in the form of weights W at the ends of the spring 37, these weights being responsive to the centrifugal action to counteract the action of the centrifugal force against the shoes. These weights W may be separate weights secured to the springs or, as shown, the weights may be integral with the springs. The springs are primarily tensed so that when the clutch is at rest, the springs backed by the abutments 39 will exert pressure against the abutments 38 on the friction shoes to hold the shoes retracted. When the clutch is operating, the centrifugal force acting on the weights W will cause the ends of the springs to function as cantilevers fulcrumed against the abutments 39 and pressing radially inwardly against the shoe abutments 38, the springs and the weights being so proportioned that the centrifugal force on the weights will counterbalance the centrifugal effort on the shoes, so that the frictional engagement of the shoes is dependent entirely on the applied air pressure in the pneumatic tube B. In order to keep the springs properly aligned laterally in the beams 34, the springs may be provided with the bearing recesses 40 for receiving the rounded ends of the shoe abutments 38.

In the constricting type of clutch shown on Figures 4 and 5, the pneumatic bag B and the friction shoes S are carried by the outer clutch member for application of the shoes to the friction ring 12 on the inner clutch member. The bag B is seated against the inner cylindrical side of the outer clutch member between the side walls or flanges 27' and 28' between the inner ends of which flanges the shoes are arranged in circumferential alignment. The openings 35' and 36' in these side flanges receive the ends of the U-frames or beams 34.

The shoes have the metal base plates 41 at their outer sides, and these base plates are preferably secured, as by vulcanizing, to the casing or body 26 of the pneumatic bag. Embedded in each shoe is a metal frame 42 of U-shaped cross section whose open end terminates at the shoe base, these frames 42 in the shoes receiving the frames or beams 34 for radial movement of the shoes relative to the frames 34. The radial movement of the shoes is further guided by the guide bars 32' extending between the side walls 27' and 28' of the outer clutch member.

The inner wall of each shoe frame 42 has a fulcrum abutment 38' extending therefrom intermediate its ends, and the frames 34 have the fulcrum abutments 39 displaced laterally outwardly from the corresponding abutments 38'. Within each frame 34 is a spring 37 abutting at its middle point the abutment 38' and outwardly thereof abutting the fulcrum abutments 39. At their ends, the springs have the weights W.

With the arrangement shown in Figures 4 and 5, the springs 37 may be normally tensed just sufficiently so that the springs will be held against the fulcrum abutments and against lateral displacement from the frames 34. Such tensing of the springs will tend to shift the shoes radially inwardly toward the inner clutch member, but as the shoes are vulcanized to the pneumatic bag B, the arrangement can be such that the bag, when deflated, will hold the shoes retracted. A valve V such as shown in connection with the structure on Figures 1 to 3 may be provided for the structure of Figures 4 and 5 for pneumatic control of the bag through the bag nipple 13', the connection between the valve and the nipple being by way of the passageway in the shaft which supports the outer clutch element 0. In order that the bag may more efficiently hold the shoes retracted, when the clutch is idle, the valve may be set for a slight suction in the bag which will hold it fully collapsed with the friction shoes fully retracted.

With the constricting type of clutch, Figures 4 and 5, when the clutch is operating, centrifugal force will tend to throw the shoes radially outwardly to lessen the friction engagement thereof with the inner clutch member. However, at the same time the centrifugal force will act on the weighted ends of the springs for cantilever action thereof against the shoes inwardly radially to counteract the centrifugal action on the shoes tending to throw them outwardly. In other words, the centrifugal action on the shoes is counteracted and counterbalanced by the weighted springs, so that the friction engagement of the shoes is controllable solely and independently by the air pressure within the pneumatic bag.

I thus provide simple and efficient means in expanding and constricting types of airflex clutches for counteracting and counterbalancing the centrifugal effort on the friction shoes when the clutch is in operation, so that the clutch functioning may be dependent entirely on the applied air pressure in the pneumatic bag and control of the clutch made more accurate and efficient.

I do not, however, desire to be limited to the exact construction and arrangement shown and described, as changes and modifications may be made without departing from the scope of the invention.

I claim as follows:

1. A rotary friction clutch comprising inner and outer concentric members, friction shoes circumferentially aligned on one of said members and radially movable thereon for friction engagement with the other clutch member, a bag on said shoe supporting member expansible to shift said shoes radially for friction engagement with said other member, and means for counterbalancing the centrifugal action on said shoes whereby the expansion of said bag will alone control the desired friction engagement of the shoes.

2. A rotary friction clutch comprising inner and outer concentric members, friction shoes circumferentially aligned on one of said members and adapted for radial movement thereon for friction engagement with the other clutch member, springs associated with said shoes tending to hold said shoes in normal position relative to said clutch members when the clutch is idle, means on said shoe supporting clutch element responsive to predetermined pressure to shift said shoes radially into friction engagement with the other clutch member, and means on said springs responsive to centrifugal action to cause said springs to function as levers to counterbalance the centrifugal action of said shoes, whereby said pressure responsive means will alone determine the friction engagement of the shoes for the desired clutch operation.

3. A rotary friction clutch comprising concentric clutch members, friction shoes circumferentially aligned on one of said clutch members and adapted for radial movement thereon for friction engagement thereof with the other clutch member, leaf springs extending through said shoes and having fulcrum engagement with said shoes and with said shoe supporting clutch member, said springs being normally tensed for holding said shoes in predetermined position relative to said clutch members when the clutch is idle, operating means on the shoe supporting clutch member responsive to predetermined pressure to shift said shoes radially for friction engagement with the other member, and means on said springs responsive to centrifugal action to cause said springs to function as levers acting against said shoes to counteract the centrifugal action on said shoes whereby said pressure responsive means will alone determine the friction engagement of the shoes for the desired clutch action.

4. A rotary friction clutch comprising inner and outer rotary concentric members, friction shoes circumferentially aligned on one of said clutch members and adapted for radial movement thereon for friction engagement with the other clutch member, a pneumatic bag on said shoe supporting clutch member expansible by fluid under predetermined pressure for shifting said shoes radially into friction engagement with the other clutch member, leaf springs extending through said shoes and fulcrumed at their middle points against said shoes and at laterally outward points against said shoe supporting clutch element, said springs being normally tensed to hold said shoes in predetermined position relative to said clutch members when the clutch is idle, said springs at their outer ends being weighted to be responsive to centrifugal action to function as cantilevers against said shoes to counterbalance the centrifugal action on said shoes when the clutch is running so that said pneumatic bag will form the sole means for determining the friction engagement of the shoes for the desired clutch action.

5. A rotary friction clutch comprising concentric clutch members, friction shoes circumferentially supported and aligned on one of said clutch members and adapted for radial movement thereon for friction engagement with the other clutch member, shoe operating means on said shoe supporting clutch member responsive to predetermined pressure to shift said shoes radially for friction engagement with the other clutch member, and spring elements having fulcrum connection with said shoe supporting member and the shoes, said spring elements functioning to hold said shoes in normal position relative to said clutch members when the clutch is idle and being constructed to be responsive to centrifugal action to counteract the centrifugal action of said shoes whereby said pressure-responsive means will alone determine the friction engagement of the shoes for the desired clutch operation.

6. A rotary friction clutch comprising concentric clutch members, frames on one of said clutch members extending in axial direction thereon along the periphery thereof, friction shoes straddling said frames for radial movement thereon for friction engagement with the other clutch member, shoe operating means on said shoe supporting clutch member responsive to predetermined pressure to shift the shoes radially on said frames for friction engagement with the other clutch member, and means in said frames engageable therewith and with said shoes and functioning to counterbalance the centrifugal action of said shoes during operation of the clutch.

7. A rotary friction clutch comprising concentric clutch members, frames on one of said clutch members extending in axial direction thereon along the periphery thereof, friction shoes straddling said frames for radial movement thereon for friction engagement with the other clutch member, shoe operating means on said shoe supporting clutch member responsive to predetermined pressure to shift the shoes radially on said frames for friction engagement with the other clutch member, and resilient means extending through said frames and having fulcrum engagement therewith and with the respective shoes, said resilient means functioning to hold said shoes in normal position relative to said clutch members when the clutch is idle and being constructed to be responsive to centrifugal action for counterbalancing the centrifugal action of said shoes during running of the clutch.

8. A rotary friction clutch comprising concentric clutch members, friction shoes circumferentially aligned on one of said clutch members and adapted for radial movement thereon for friction engagement with the other clutch member, shoe operating means on said shoe supporting clutch member responsive to predetermined pressure to shift said shoes radially for friction engagement with the other clutch member, and elastic bars having fulcrum engagement with said shoes and said shoe supporting member and shaped to respond to centrifugal action to counteract the centrifugal action of said shoes whereby said pressure responsive means will alone determine the friction engagement of the shoes for the desired clutch operation.

EMIL R. GASSER.